(12) United States Patent
Wall et al.

(10) Patent No.: US 8,185,459 B2
(45) Date of Patent: May 22, 2012

(54) SYSTEM, METHOD AND COMPUTING DEVICE FOR DETECTING DUPLICATE FINANCIAL DOCUMENTS

(75) Inventors: John Wall, Toronto (CA); Paul van den Ende, Mississauga (CA); Brian Salway, Toronto (CA); John Loeser, Toronto (CA); Edward Jose Mamede, Burlington (CA); Felix Chih-Han Wu, Thornhill (CA); Marius Dan Stroe, Ajax (CA)

(73) Assignee: Symcor Inc., Mississauga, ON (CA)

( * ) Notice: Subject to any disclaimer, the term of this patent is extended or adjusted under 35 U.S.C. 154(b) by 411 days.

(21) Appl. No.: 12/153,175

(22) Filed: May 14, 2008

(65) Prior Publication Data

US 2009/0285471 A1 Nov. 19, 2009

(51) Int. Cl.
*G06Q 40/00* (2006.01)

(52) U.S. Cl. .......... 705/35; 707/999; 707/713; 382/192; 711/128; 235/375; 705/50; 705/64

(58) Field of Classification Search .................. 235/375; 382/192; 707/999; 711/128, 157; 705/64, 705/50

See application file for complete search history.

(56) References Cited

U.S. PATENT DOCUMENTS

| | | | |
|---|---|---|---|
| 5,680,611 A | | 10/1997 | Rail et al. |
| 6,088,119 A | * | 7/2000 | Manchala et al. ........... 358/1.14 |
| 6,690,826 B2 | * | 2/2004 | Slavin ........................... 382/192 |
| 6,757,675 B2 | * | 6/2004 | Aiken et al. ........................... 1/1 |
| 7,028,886 B1 | * | 4/2006 | Maloney ...................... 235/375 |
| 7,178,721 B2 | | 2/2007 | Maloney |
| 7,647,331 B2 | | 1/2010 | Li et al. |
| 2007/0143530 A1 | * | 6/2007 | Rudelic et al. ............... 711/103 |

OTHER PUBLICATIONS

Govindaraju, Naga, "Sorting and Searching," SIGGRAPH 2007, Microsoft Corporation.
Luebke, D. et al., "GPGPU: General Purpose Computation on Graphics Hardware," ACM SIGGRAPH International Conference on Computer Graphics and Interactive Techniques, 2004.
"Nvidia Cuda Compute Unified Device Architecture," CUDA Programming Guide Version 1.0, 2007, Nvidia Corporation, Santa Clara, CA.

* cited by examiner

*Primary Examiner* — Harish T Dass

(57) ABSTRACT

A method and system are disclosed for identifying in real time duplicate financial documents processed by a financial institution or check clearinghouse. A collection of hash values representative of previously processed financial documents are maintained in a memory, such as a GPU memory. When a new financial document enters the financial institution or check clearinghouse for processing, one or more features of the financial document are captured. A hash value is generated from the one or more features of the financial document. A search is performed in the collection of hash values for a matching hash value. If a match is found, a potential fraudulent event or operational error may be indicated. If a match is not found, the hash value representative of the new financial document is added to the collection of hash values.

27 Claims, 14 Drawing Sheets

SYSTEM, METHOD AND COMPUTING DEVICE FOR DETECTING DUPLICATE FINANCIAL DOCUMENTS

FIELD OF THE INVENTION

The present invention relates generally to document processing, and more particularly to the detection of duplicate processing of financial documents.

BACKGROUND OF THE INVENTION

Financial fraud is a problem. People have devised creative ways of defrauding financial institutions including altering financial document data. People have also been known to create counterfeit copies of financial documents (and in particular financial instruments) and to pass those counterfeit copies through the financial system. For example, fraudsters have been known to alter checks to change the amount or the name of the payee; fraudsters have also have also been known to duplicate checks and attempt to cash the duplicates.

To combat fraud, financial institutions may keep records of financial documents that have already been processed. For example, electronic images of cashed checks are captured and archived. However, in North America alone, billions of financial documents may pass through the financial system each year. Thus, efficiently searching through the billions of financial documents for duplicate documents poses a significant problem.

At the same time, accidental duplicate processing of documents may occur as a result of error or oversight, for example, on the part of a bank or financial clearing centre. For example, a transaction may be passed twice through the banking/clearing system. Although detectable and correctable, such errors tend to become apparent after funds have been transferred, making their correction time consuming, labour intensive, and ultimately costly.

Accordingly, there remains a need for methods and systems for quickly, and in real time, detecting processing of duplicate documents, particularly financial ones.

SUMMARY OF THE INVENTION

In accordance with the present invention, a graphics processing subsystem (or similar processor) is used to search entries representing processed financial documents, in real time, as such documents are processed to assess whether or not any particular document has previously been processed.

Conveniently, graphics processing subsystems may efficiently search and maintain search entries representing millions or even billions of financial documents.

In a first aspect of the present invention, there is provided a method of managing financial document data comprising: maintaining at least a subset of a collection of hash values in a memory of a computer graphics processing subsystem, wherein the memory is partitioned into a plurality of blocks, wherein the plurality of blocks is searchable by the graphics processing subsystem in parallel, and wherein each of the hash values is representative of a feature or features of a financial document; generating a hash value for a given financial document, the hash value representative of the feature or the features of the given financial document; executing graphics processing subsystem executable instructions on the graphics processing subsystem, the instructions directing the graphics processing subsystem to search at least a subset of the plurality of blocks concurrently for a hash value matching the hash value representative of the given financial document; and returning an indicator indicating whether a matching hash value was found in the memory of said graphics processing subsystem.

In a second aspect of the present invention, there is provided a system for financial documents, comprising a duplicate document detection subsystem and a capture subsystem in communication with the duplicate document detection system. The duplicate document detection subsystem comprises a first computing device. The first computing device comprises at least one graphics processing subsystem. Each of the graphics processing subsystems comprises: a memory storing a plurality of hash values, the memory partitioned into a plurality of memory blocks; and a programmable graphics processing unit operable to search the plurality of memory blocks in parallel and return an indicator if a value matching an input hash value is found in any of the plurality of memory blocks. The capture subsystem comprises a capture device for capturing one or more features of the financial document. The capture subsystem also comprises a second computing device. The second computing device comprises a processor operable to generate at least one hash value from the one or more features of the financial document and pass the at least one hash value to the duplicate document detection subsystem as an input hash value.

In a third aspect of the present invention, there is provided a computing device for detecting duplicate documents. The computing device comprises at least one graphics processing subsystem and a processor. Each of the graphics processing subsystems comprises a memory storing a plurality of hash values, each of the hash values representative of a feature or features of a document, the memory partitioned into a plurality of memory blocks; and a programmable graphics processing unit operable to search the plurality of memory blocks in parallel and return an indicator if a value matching an input hash value is found in any of the plurality of memory blocks. The processor is operable to instruct the at least one graphics processing subsystem to search at least a subset of the plurality of memory blocks concurrently for the input hash value.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
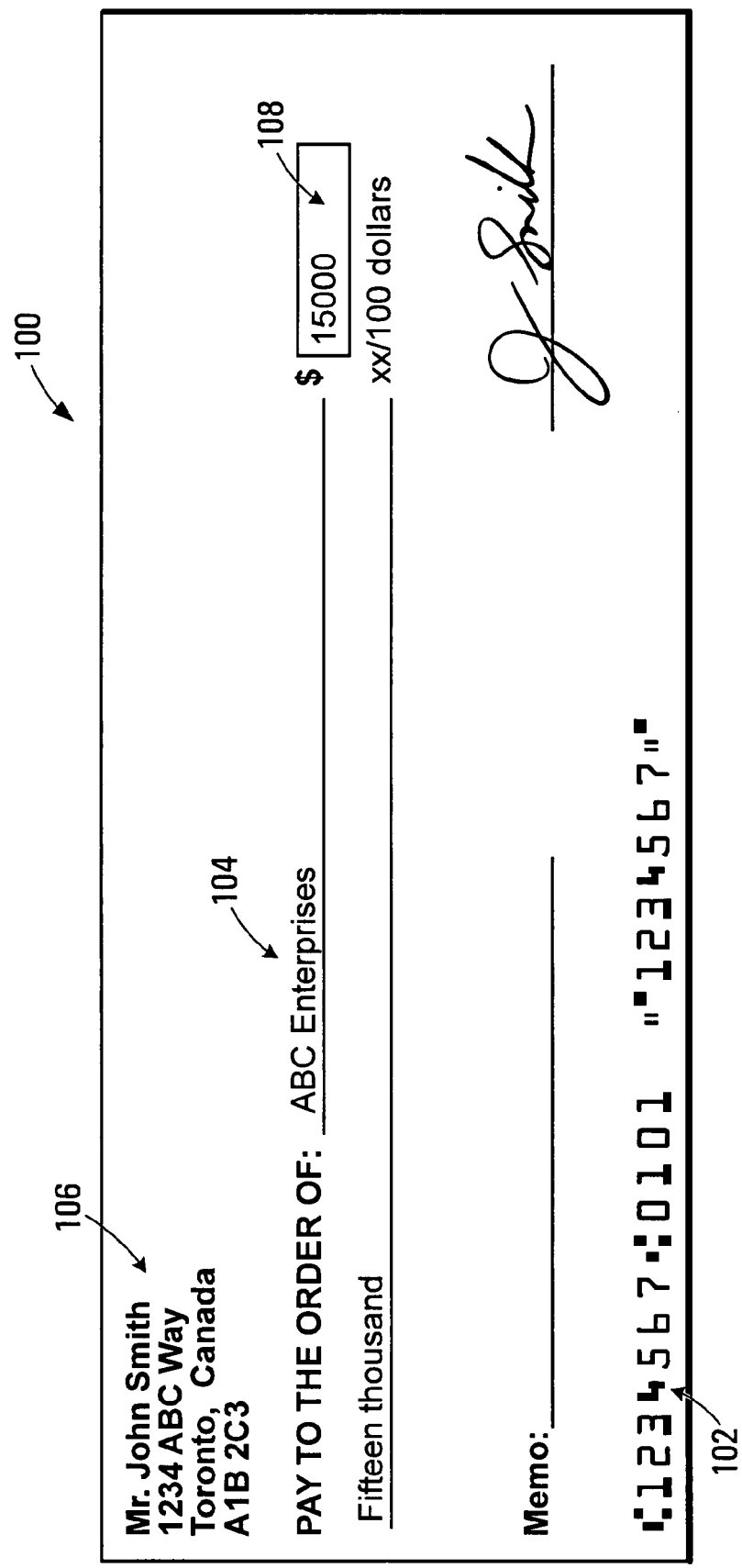
FIG. 1 illustrates an example financial document, a check, processed by the check processing system of FIG. 2 and by the duplicate document detection system of FIG. 3.

FIG. 1 illustrates an exemplary financial document, a check 100, which is commonly used as a method of payment in commerce. Printed on check 100 may be the name and address of the payor 106 ("Mr. John Smith, 123 ABC Way, Toronto, Canada, A1B 2C3"), the name of the payee 104 ("ABC Enterprises"), the courtesy amount 108 ($15,000), and a series of numbers 102 encoded in magnetic ink at the bottom of the check, known as Magnetic Ink Character Recognition (MICR) data.

Check 100 is typically given as a form of payment to a payee. Thereafter, the payee (or a holder in due course) may submit the check to a financial institution for payment. After submission of the check to the institution funds are transferred between the payor bank and the payee's bank, and payment is settled. Financial processing of the check between submission and settlement is referred to as clearing.

Check 100 may be processed by exemplary system 200 (FIG. 2) as part of this check clearing. System 200 may be operated by or on behalf of one or more financial institutions. In particular, it may be desired to capture and store images of checks that have already been processed for a multitude of reasons including record-keeping.

System 200 also serves as a convenient locale for detecting possible fraud. For example, fraudsters could attempt to deposit the same check twice, for example, by making multiple copies of a check and depositing each of the copies, possibly altering one or more fields (e.g. the payee 104 or courtesy amount 108 fields) during the process. In this regard, a method and system that detects attempts to process a check or other financial document more than once or where an attempt is being made to process an altered financial document (e.g. check 100) at or in conjunction with system 200 may be highly desirable. Moreover, apart from fraud detection, such method and system may be used to catch operational errors where a financial document may be accidentally run through system 200 more than once.

Figure 2:
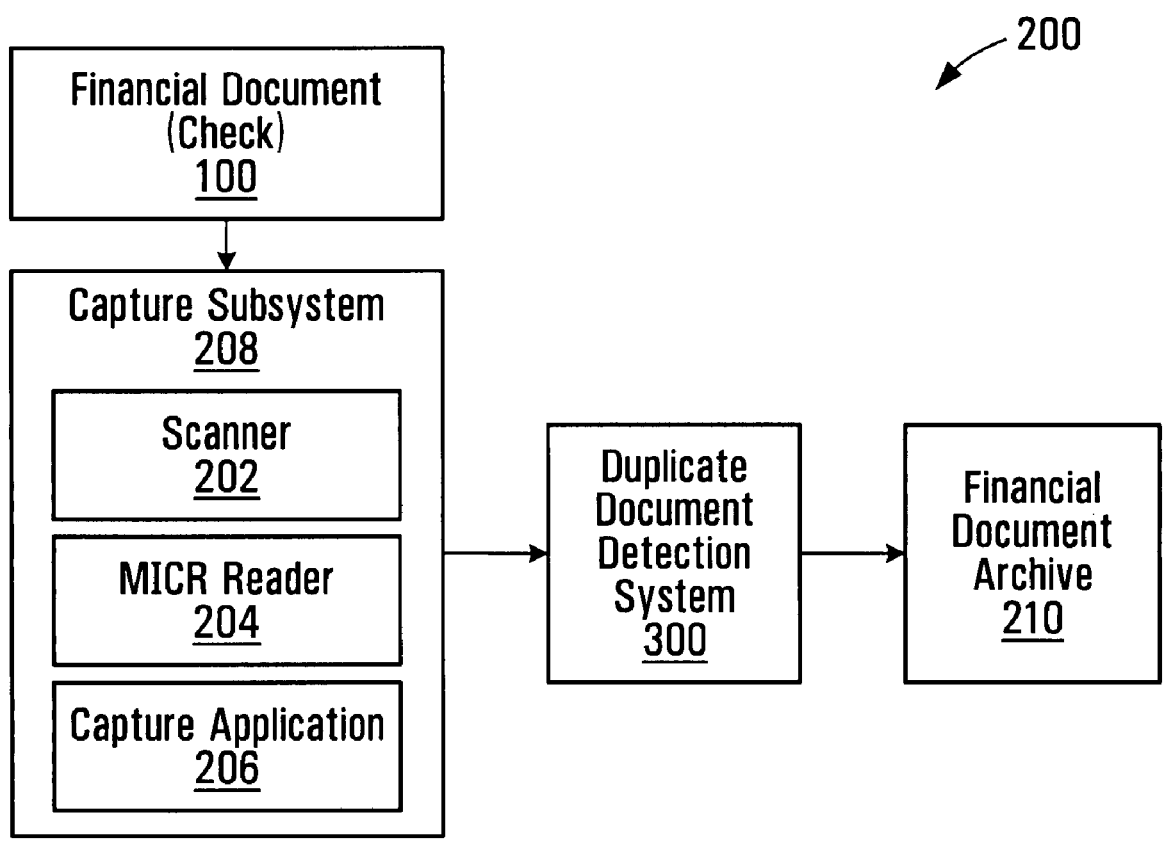
FIG. 2 is a block diagram of an exemplary check processing system which includes, as a component, the duplicate document detection system of FIG. 3.

As illustrated in FIG. 2, system 200 may include a capture subsystem 208 into which check 100 (or other financial documents) may be input, duplicate document detection (DDD) system 300 which is exemplary of an embodiment of the present invention, and financial document archive 210. Capture subsystem 208 may output a digital representation or representations of check 100 which representation(s) is/are then input to DDD system 300. The representation(s) of check 100 may subsequently be persistently stored in financial document archive 210.

Exemplary capture subsystem 208 may be designed to digitally capture data from checks. Specifically, capture subsystem 208 may include a check scanner 202, a MICR reader 204 and a capture software application 206. Check scanner 202 may be a standalone check scanner such as those manufactured by NCR, Unisys, Cannon or IBM (e.g. Unisys My Vision X, Panini MyVision, Canon CR-25,55, or CR-180). Similarly, MICR reader 204 may be a standalone MICR reader. Alternatively, and as is more typical, check scanner 202 and MICR reader 204 may be components of a high-speed check processing transport or a high-speed document processor such as the NCR iTRAN 8000, Unisys DP1800, IBM 3890 or the like. In this case, check scanner 202 may be a high speed digital scanner that captures images of the front and back of check 100, and MICR reader 204 may read the magnetic ink data 102 ("MICR line" 102) at the bottom of check 100. Optionally, certain fields on check 100, such as MICR line 102 or courtesy amount 108, may undergo optical character recognition ("OCR'ed"). Capture application 206 may be hosted on a conventional computing device to which check scanner 202 and MICR reader 204 may be directly connected. Alternatively, images of checks captured by scanner 202 and MICR line data 102 read by MICR reader 204 may be sent to the computing device hosting capture application 206, and thus check scanner 202 and MICR reader 204 may not be directly connected to the computing device hosting capture application 206. The function of capture application 206 will be further described below. It may, however, be appreciated that capture subsystem 208 may be designed in other ways to capture financial documents other than checks.

Financial document archive 210, which may persistently store data representing financial documents processed by system 200, may be a computing device hosting a database engine and in communication with persistent storage memory, in the form of magnetic, optical or other memory suitable for the storage of large volumes of financial data (e.g. images). Exemplary archive 210 may, for example, take the form of an RS600 computing device, hosting a DB2 database. Conveniently, exemplary archive 210 may store images of financial documents processed by system 200 along with ancillary data associated with each image such as MICR data, date processed, and source of image (e.g. the name of the financial institution from which the image was sent or the location where the financial document was scanned).

Figure 3:
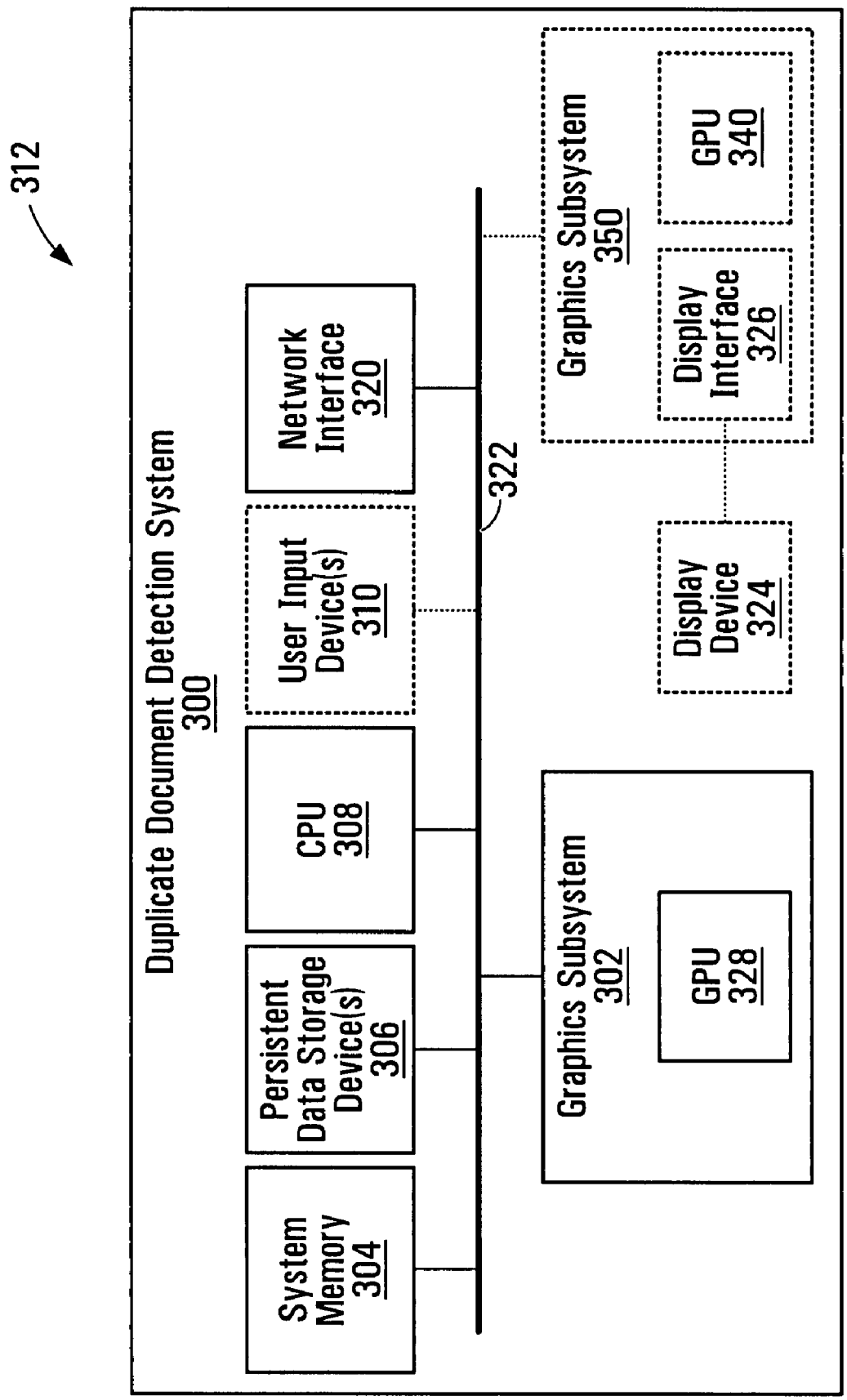
FIG. 3 is a block diagram of a device hosting a duplicate document detection system, exemplary of an embodiment of the present invention.

An exemplary DDD system 300, exemplary of an embodiment of the present invention, is depicted in FIG. 3. In particular, DDD system 300 may be hosted on computing device 312. Computing device 312 may be a conventional computing device including, for example, a CPU 308, a network interface 320, one or more optional user input devices 310 (e.g. keyboard, mouse), one or more persistent data storage devices 306 and system memory 304 hosting an operating system such as Linux, Windows XP, Vista, Unix, MacOS or the like.

Computing device 312 includes a graphics subsystem 302 and may optionally include a second graphics subsystem 350. Graphics subsystem 302 may be a graphics processor with a graphics processing unit 328. As may be appreciated by those of ordinary skill, graphics processing unit 328 may be a dedicated graphics rendering device designed to manipulate and display graphics on display device 324. Notably, GPU 328 may be a GPGPU such as the Nvidia Tesla graphics card that is compatible with Nvidia's CUDA ("Compute Unified Device Architecture") technology. Second graphics subsystem 350 may include a conventional graphics processing unit 340 connected to display interface 326 which in turn may be interconnected to optional display device 324. Display device 324 may be a conventional computer monitor. To this end, display interface may be a conventional DVI interface, RAMDAD, or the like. Both graphics subsystem 302 and 350 may communicate with other components of computing device 312 such as CPU 308 and system memory 304 by way of bus 322. Bus 322 may be a high speed system interface or a high speed peripheral interconnect bus, such as the PCI, PCI-express, or the like.

Conveniently, the high degree of parallel processing on GPUs (developed specially for parallel computation-intensive graphics rendering) also makes them conducive for use as general-purpose processors. Used in this manner, calculations and algorithms, traditionally designed to execute only on a CPU, may be executed on a GPU. Specifically, calculations and algorithms may be designed to be more efficient by coding them in a multi-threaded manner to take advantage of multi-threaded execution on a GPU. Moreover, multiple sections of code may be written so that they are executable in parallel on a GPU. As a result, the overall execution time of a program (i.e. calculation or algorithm) may be reduced. See, e.g. *GPGPU: General Purpose Computation on Graphics Hardware, SIGGRAPH* 2004, the contents of which are incorporated herein by reference.

In the past, in order to use the GPU as a general purpose processor, software programmers may have abused shader functions (e.g. vertex shaders and pixel shaders) of the GPU. Shader programs were written in languages such as Assembly, Cg, GLSL and HLSL, ("shader languages"); consequently, programmers were required to write code even for general purpose calculations in a shader language. Additionally, programmers were required to manipulate both data and algorithms such that the data could be input in a format understandable by a shader program to produce a desired output (e.g. a desired transformation/calculation on the input data). These difficulties limited the extent to which GPUs could be used for general purpose programming.

However, GPUs today have moved towards general purpose computing. In particular, such GPUs, known as GPGPUs, may be more flexibly programmed. Examples of GPGPUs include Nvidia's Tesla processor, Intel's Larrabee processor, and AMD-ATI's CTM ("close to metal") initiative.

Figure 4:
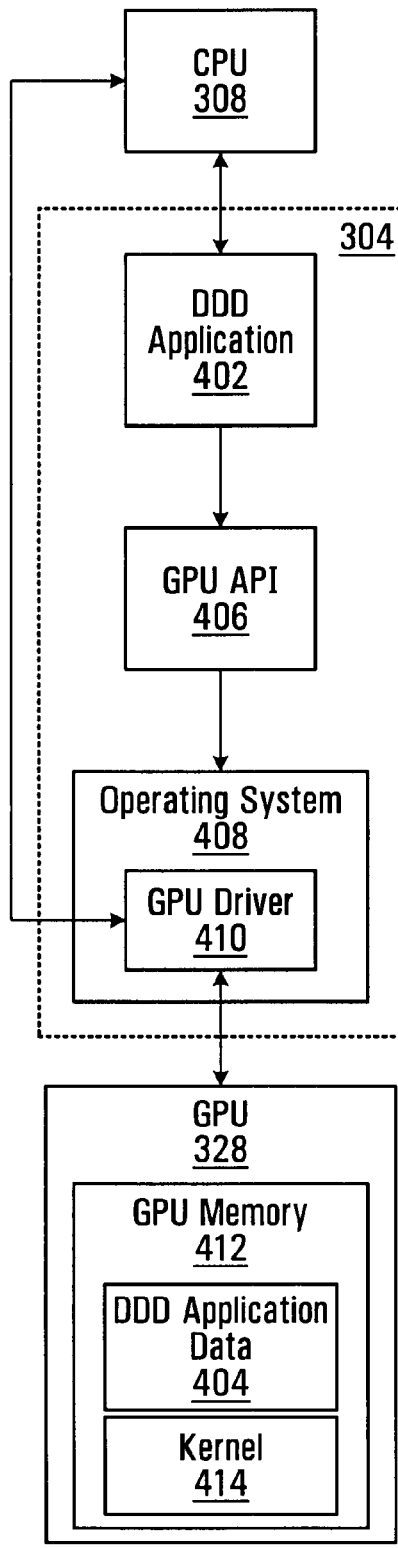
FIG. 4 is a block diagram depicting the CPU, contents of system memory, and components of the graphics subsystem of the device of FIG. 3.

FIG. 4 is a block diagram depicting the relationships between CPU 308, the contents of system memory 304, GPU 328 and GPU memory 412. Specifically, system memory 304 may contain DDD software application 402, and operating system 408. Operating system 408 may, for example, be the aforementioned Linux, Windows XP, Vista, Unix, MacOS, or the like. CPU 308 executes operating system 408 and DDD application 402, exemplary of embodiments of the present invention. DDD application 402 may interface with GPU 328 through GPU application programming interface (API) 406. In turn, GPU API 406 may interface with GPU driver 410 via operating system 408 to control low level operation of GPU 328.

GPU API 406 may be, for example, the CUDA (Compute Unified Device Architecture) API for Nvidia's GPUs. As may be appreciated by a person of ordinary skill, the CUDA API is an extension of the C programming language that allows software programmers to write programs for execution by a GPU. Moreover, using the CUDA API, a programmer may in a given body of code specify blocks of code that are to be executed by the CPU, e.g. CPU 328, (i.e. code that compiles into instructions executable on the CPU) and blocks of code that are to be executed on the GPU, e.g. GPU 328, (i.e. code that compiles into instructions executable on the GPU). More information regarding CUDA may be found in the *Nvidia CUDA Compute Unified Device Architecture. Programming Guide, Version* 1.0, the contents of which are incorporated herein by reference.

Moreover, GPU 328 may interface with GPU memory 412. GPU memory 412 may be GPU accessible memory, which may be accessed by instructions (including executing threads) executing on GPU 328. GPU memory 412 may be memory on the GPU processor or may be memory interconnected with GPU 328 for relatively fast access. GPU memory 412 may for example be interconnected to GPU 328 by way of a local memory bus, separate from the memory bus of CPU 308. GPU memory 412, may for example be DDRAM forming part of a graphics subsystem formed on a peripheral interface card. In any event, GPU memory 412 may be memory local to GPU 328. DDD application data 404 may be stored in GPU memory 412.

GPU memory 412 may also contain software for execution by GPU 328—referred to as kernel 414. As may be known to those of ordinary skill in the GPGPU art, a portion of an application that is executed many times, but independently on different data, may be isolated into a function. The function may be executed on GPU 328 by a plurality of different threads. The function may be compiled into the GPU 328 instruction set (so that it may execute natively on GPU 328), and the resulting program, known as the "kernel", may be downloaded to GPU 328. As will be further explained below, program execution may be distributed between GPU 328 and CPU 308 to increase the overall efficiency of the program.

Figure 5:
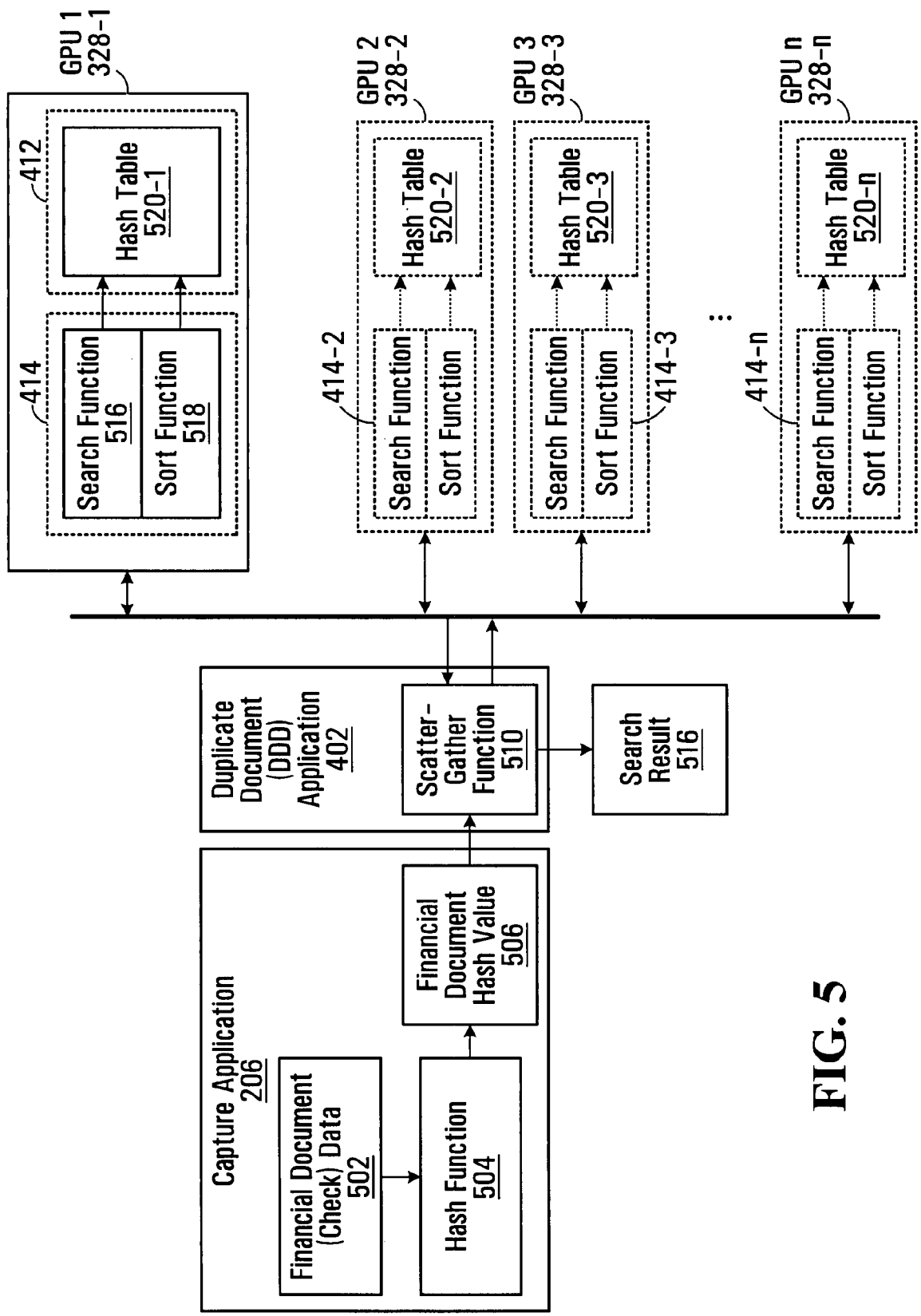
FIG. 5 is a schematic diagram depicting components of the exemplary check processing system of FIG. 2, which includes the duplicate document detection system of FIG. 3.

FIG. 5 is a schematic diagram depicting components of system 200 including DDD system 300, namely, capture application 206, DDD application 402, and GPU 328. Optionally, DDD system 300 may include additional GPUs 328-2, 328-3, ..., 328-n. Notably, DDD system 300 may be implemented with a single GPU or with multiple GPUs. Operation of DDD system 300 will be described in the context of a single GPU system. However, as appropriate, explanations of DDD system 300 as a multiple GPU system will be provided.

Beginning with capture application 206 (FIG. 2), a representation of check 100 may be captured by one or both of scanner 202 (i.e. an image representation) and MICR reader 204 (e.g. a string representation of MICR line 102) to form financial document data 502. Financial document data 502 may then be input into a hash function 504 to form financial document hash value 506.

As may be appreciated by those of ordinary skill, different hash functions exist. The choice of a hash function dictates the likelihood that two different inputs may produce the same hash value (i.e. the likelihood of producing a false collision). It may be appreciated that depending upon the technical application, a suitable hash function 504 may be chosen to output a desired expected number of unique hash values. In this particular technical application, a hash function that outputs a very small number of collisions may be employed so as to provide a large set of uniquely identifiable financial documents. To further clarify, if two representations of two different financial documents were to hash to the same hash value (i.e. collide), the two financial documents would no longer each be uniquely identifiable by its hash value. However, if the two representations hash to different hash values, then the financial documents may be uniquely identified by hash value. For this reason, it is helpful if hash function 504 produces as many unique hash values as is practicable. For example, a hash value may be computed based on, for example, the MD5 or Haval hash functions.

The financial document data 502 (or a portion thereof should be consistently ascertainable for any particular financial document. In this way, a hash value of this document data 502 would be unique and reproducible for any particular document. For example, MICR data on a check (including the check serial number, routing transit number, account number, and other transaction-specific data (e.g. courtesy amount)) is unique, and may be unambiguously and consistently read: no two cheques include the exact same MICR data; yet each read of the MICR data will result in the same data being read.

Figure 9A:
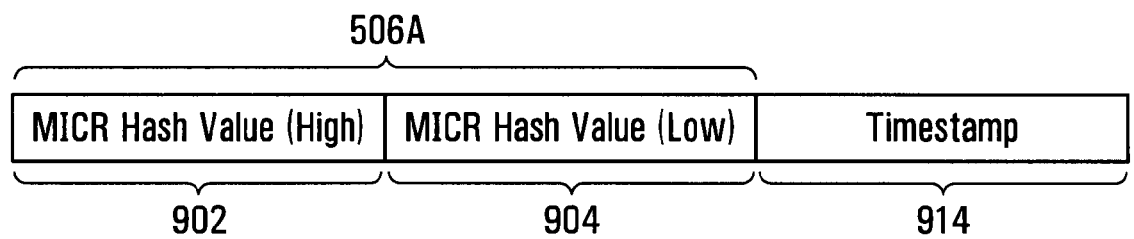
FIGS. 9A and 9B illustrate exemplary representations of financial document data in the system of FIG. 3.
Figure 9B:
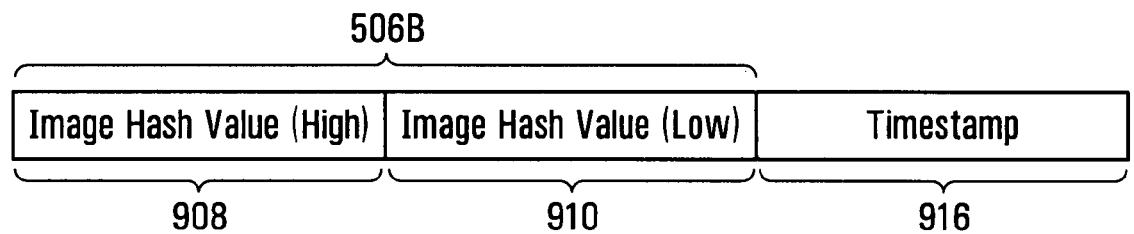

In the depicted embodiment, as illustrated in FIGS. 9A and 9B, document data 502 allows calculation of two hash values: MICR hash value 506a and image hash value 506b. As will be further explained below, image hash value 506b may be generated from the image data itself. It may, however, be appreciated that only one of hash values 506a and 506b need be generated; that is, check 100 may be represented by a single hash value (e.g. MICR hash value 506a). For the remainder of this document, hash values 506a and 506b may be individually and collectively referred to as hash value(s) 506. As noted, the hash value, however, should be easily reproducible from a given document. In an exemplary embodiment of the present invention, two hash values are kept for reasons that will be further explained below.

As noted, DDD system 300 may be a component of a check processing system 200 utilized by, for example, a check clearinghouse or a financial institution. In overview, when a new financial document (e.g. a check 100) is received by the clearinghouse, the check 100 may be input into capture subsystem 208. Check 100 may be scanned and its MICR line 102 read. An image hash value may be produced from the image of check 100, and an MICR hash value may be produced from the MICR line of check 100. It may be appreciated that each of the hash values is representative of a feature of check 100 (i.e. image, and MICR line). Image data may be provided in a conventional image format, such as a TIFF file; an image bitmap; a jpeg file, or the like. Alternatively, an image hash could be calculated upstream as the document image is being converted into a suitable image format. Both hash values may then be input into DDD system 300, which may in turn return an indication of whether one or both of the hash values have previously been stored. The significance of one or both of the hash values being previously stored will be further explained below.

Specifically, once generated by capture application 206, hash value 506a and/or hash value 506b may next be input to DDD application 402. DDD application 402 may direct GPU 328 to search for hash value 506a or hash value 506b (collectively 506) (more typically hash value 506a) in hash table 520. As will be further detailed below, hash table 520 may contain a collection of hash values, each representative of an already processed financial document. If hash value 506 is found in hash table 520, this may signify that the financial document represented by the hash value 506 (i.e. check 100) has previously been processed by system 200. This may be an indicator of fraud, or error. Conversely, if hash value 506 is not found in hash table 520, this may indicate that check 100 has not previously been processed by system 200. In particular, search result 516, output by DDD application 402, may indicate whether hash value 506 was found in hash table 520. Hash value 506 may also then be added to hash table 520 to signify that check 100 has been processed by system 200.

Conveniently, hash table 520 may be held in GPU memory 412 (FIG. 4) thus allowing quick searching of a large number of hash values (i.e. in hash table 520). To this end, hash table 520 may continuously be held in GPU memory 412 (i.e. DDD system 300 may be "up and running" at all times). Thus, conveniently, as a new financial document enters system 200 for processing, duplicate document detection may occur in real time. For contingency purposes, however, hash table 520 may be periodically written out to disk (e.g. persistent data storage device(s) 306).

As will become apparent, in the presence of multiple GPUs, hash table 520 may be distributed across the GPU memories of the multiple GPUs. That is, each individual GPU may host in its memory a subset of the collection of hash values making up hash table 520. Each of the multiple GPUs may search the subset of hash values of hash table 520 in its local GPU memory 412 (i.e. its subset of the collection of hash values) for the presence of the hash value 506 of a document being processed. As well, the hash value 506 may be added to local memory of one of the multiple GPUs to indicate that the financial document from which hash value 506 was generated has been processed.

To allow searching for hash value 506, kernel 414 (FIG. 4) may also include a search function 516, which is executed by GPU 328 to effect the search of hash table 520 for a given hash value 506a. Kernel 414 may also include a sort function 518, which is executed by GPU 328 to sort the hash values or a subset of hash values in hash table 520. Conveniently, because search function 516 and sort function 518 form part of kernel 414, multiple execution instances of search function 516 and sort function 518 may be executed in parallel on different sets of hash values (held in hash table 520 in GPU memory 412) by threads executing concurrently on a single GPU 328, as detailed above.

Figure 6:
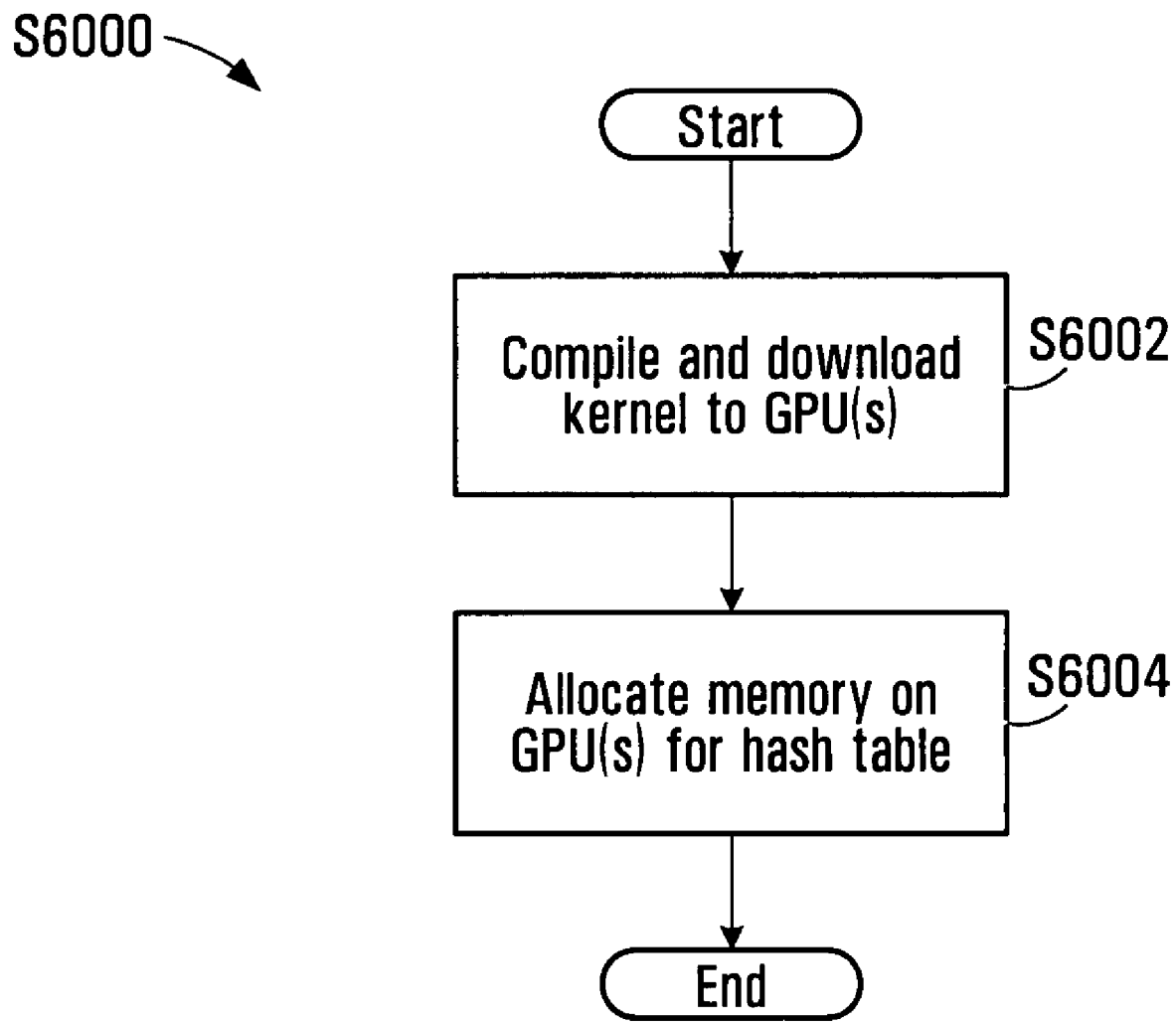
FIG. 6 is a flow diagram depicting the steps of initializing the GPU to be used by the duplicate document detection system of FIG. 3.

At the outset, GPU 328 may be initialized for use by DDD system 300 as detailed in FIG. 6. Specifically, flow diagram S6000 depicts initialization. S6000 may be performed, for example by CPU 308 executing DDD application 402. Specifically, in S6002, kernel 414 may be compiled and downloaded to GPU 328 (S6002). Memory space to hold hash table 520 may also be allocated in GPU memory 412 in S6004.

In an exemplary embodiment implemented using the CUDA API, code for search function 516 and for sort function 518 ("kernel 414 code") may be specified in S6002 by encapsulating the code in a "_global_" function. An example function declaration for search function 516 may be "_global_ void Search( . . . )", and the body of the function may contain code for searching a block of GPU memory 412. An example function declaration for sort function 518 may be "_global_ void Sort( . . . )", and the body of the function may contain code for sorting the values contained in a block of GPU memory 412.

Kernel 414 may be compiled to GPU 328 for execution on GPU 328, using, for example, the nvcc (Nvidia C) compiler. Memory space may be allocated in GPU memory 412 for hash table 520 by e.g. calling the "cudaMalloc( )" function which allocates a user-specified number of bytes of linear memory on GPU 328 (S6004).

Figure 7:
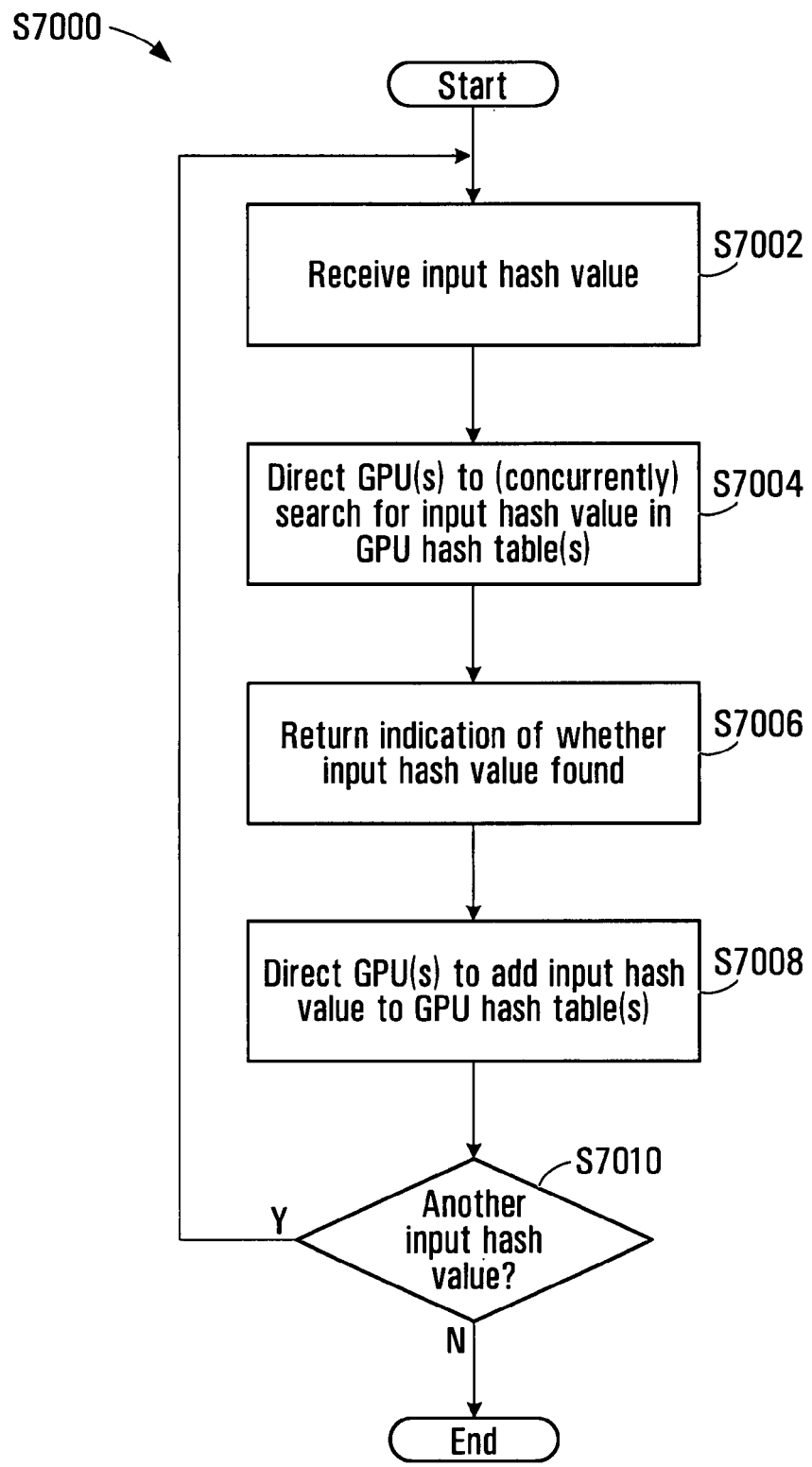
FIG. 7 is a flow diagram depicting an overview of the functions performed by a duplicate document detection (DDD) software application of FIG. 5.

Flow diagram S7000 (FIG. 7) provides a high-level overview of the operation of DDD application 402 executing on CPU 308. As previously described in conjunction with FIG. 2, DDD application 402 may receive an input hash value (e.g. hash value 506) (S7002). DDD application 402 may direct GPU 328 to search in hash table 520 (S7002) for hash value 506. In the presence of multiple GPUs, DDD application may direct multiple GPUs to concurrently search for hash value 506 (S7004). DDD application 402 may then return an indication (e.g. to display device 324 or to a calling application) of whether the input hash value was found (search result 516) (S7006).

DDD application 402 may further direct GPU 328 to add the input hash value 506 (and possible ancillary data) to hash table 520 (S7008). In the presence of multiple GPUs, DDD application may direct a single GPU (typically selected round-robin) to add hash value 506 to its local GPU memory 412. DDD application 402 may continue to execute as long as it continues to receive input hash values (S7010).

Figure 8:
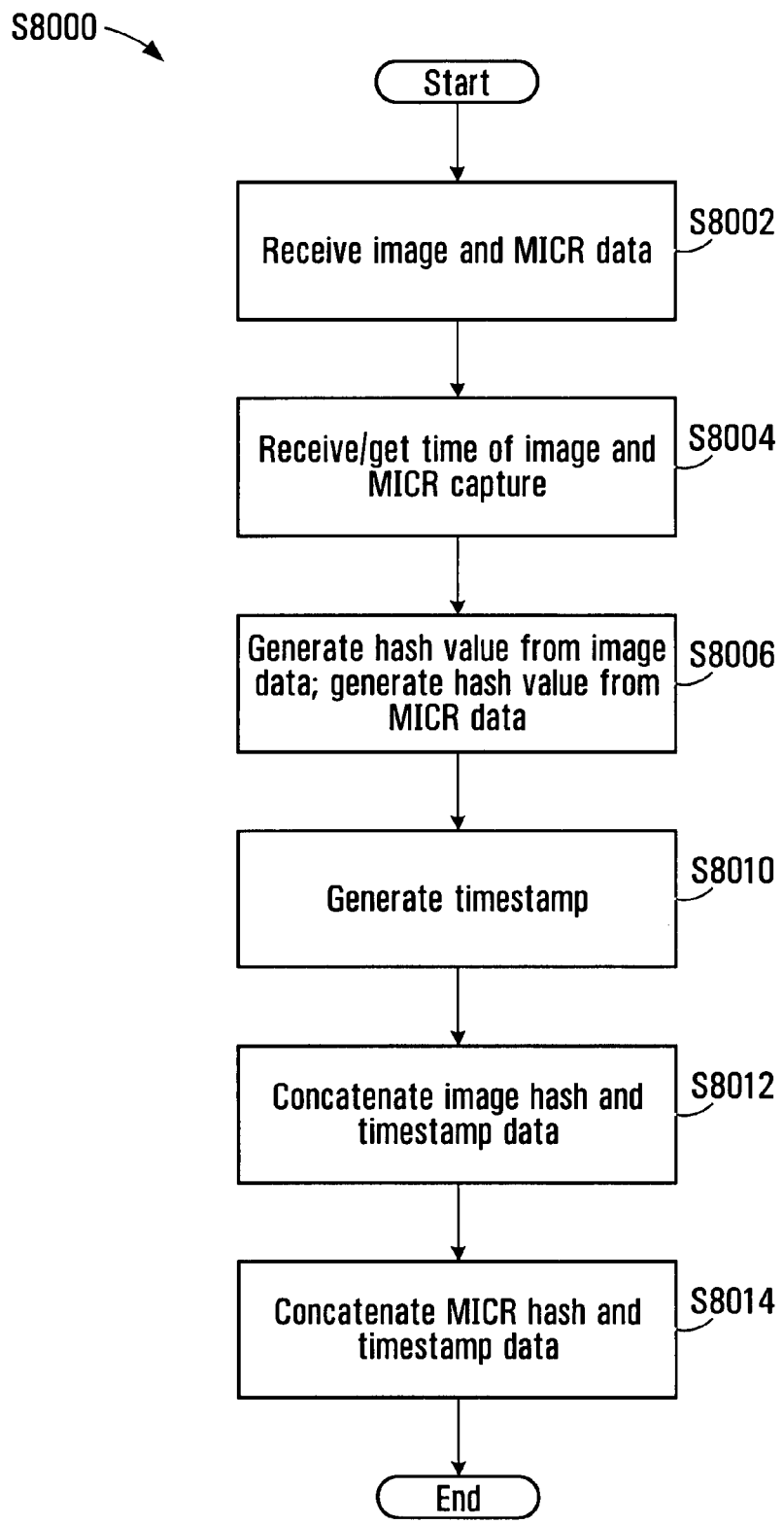
FIG. 8 is a flow diagram depicting operation of the capture application of FIG. 5.

Flow diagram S8000 (FIG. 8) depicts operation of capture application 206 (FIG. 2) in the context of operation of system 200 to form financial document hash value 506 from a currently processed financial document—such as check 100. Operation of capture application 206 is also described in conjunction with FIGS. 9A and 9B.

More specifically, capture application 206 may receive image data and MICR data of check 100 from scanner 202 and MICR reader 204, respectively (S8002). Capture application 206 may also receive or get an associated timestamp of image and MICR capture at scanner 202 and MICR reader 204 (S8004).

Capture application 206 may then generate an image hash value (506b, FIG. 9B) from the image data by inputting image data (or a subset of the image data) into a hash function (e.g. hash function 504). Conveniently, the full byte array of the image file may be input into hash function 504. Other methods of generating a hash value from an image may be known to those of ordinary skill. For example, some methods are discussed in US Application 2007/0239756 A1. One such method may include generating a feature vector for the image and inputting the feature vector into a hash function. The feature vector may be based on, e.g. a color histogram of the image.

Capture application 206 may also generate a MICR hash value (506a, FIG. 9A) from the MICR data by e.g. inputting the numbers on MICR line 102 into the hash function 504. As noted, that MICR line 102 will be unique for each check as it is formed from, among other things, the payor's account number and the payor's bank number. Next, a timestamp (914 and 916) may be generated from the time of image and MICR capture received or obtained at step S8004 (S8010). The image hash value (506a) and timestamp (914) may be concatenated (i.e. joined) (S8012) and similarly the MICR hash value (506b) and timestamp (916) may be concatenated (S8014) (FIGS. 9A and 9B). Of course, the generation of a timestamp and the concatenation of the timestamp to MICR hash value 506a and image hash value 506b is optional, but may be useful for reasons to be explained below.

Conveniently, hash values 506a and 506b may each be represented in memory (e.g. system memory 304 or GPU memory 412) as a 64 bit hash value. Consequently, for reasons that will also be further explained below, image hash value 506a may be divided into MICR hash value high portion 902 (the most significant 32 bits) and MICR hash value low portion (the least significant 32 bits). Similarly, image hash value 506b may be treated as image hash value high portion 908 and image hash value low portion 910. Timestamp 914 and 916 may be a 32 bit value.

Figure 10:
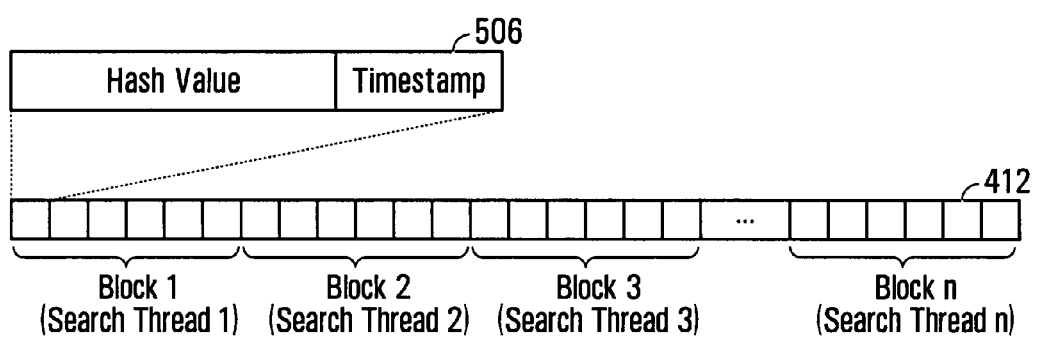
FIG. 10 is a block diagram illustrating an exemplary method of partitioning GPU memory on a GPU of FIG. 5.

Now, in order to take advantage of the parallel execution capabilities of GPU 328, GPU memory 412 may be logically partitioned into a plurality of memory blocks 1, ..., m, as depicted in FIG. 10. As will become apparent, use of multiple partitions allows distribution of hash values across the partitions; sorting within each partition; and concurrent searching of multiple partitions.

Figure 11:
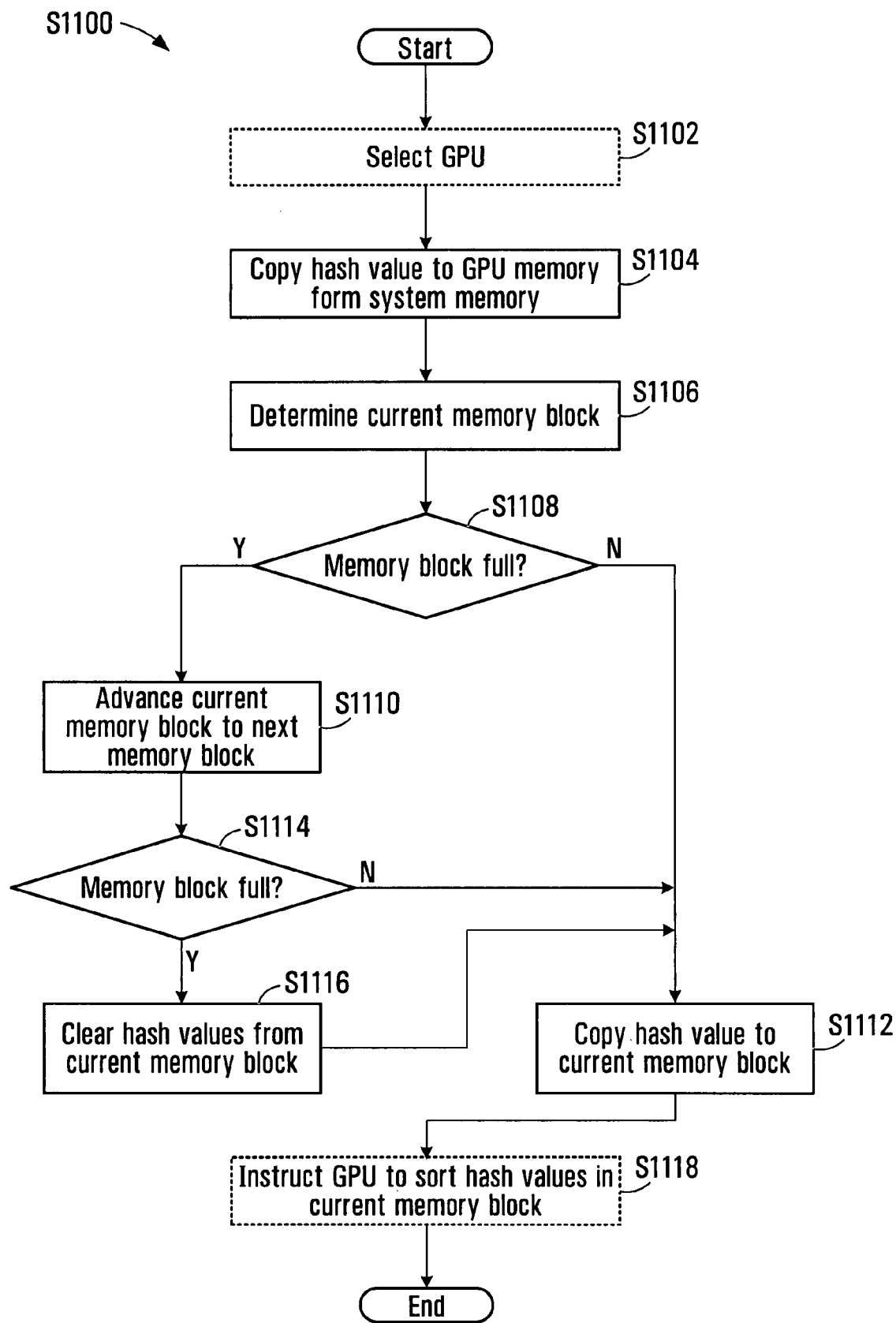
FIG. 11 is a flow diagram depicting an insert operation of the DDD software application of FIG. 5.

Insertion of a new hash value and ancillary data (e.g. hash value 506 for in-process documents, and timestamp(s) 914/918) by DDD application 402 and kernel 412 to hash table 520 is explained in conjunction with flow diagram S1100 (FIG. 11). Initially, hash value 506 may reside in system memory 304. In the single GPU embodiment, the hash value to be added may be copied to GPU memory 412 from system memory 304 (or wherever else the hash value may be stored) (S1104). Conveniently, the CUDA API provides functions for copying a value from system memory 304 to GPU memory 412 (e.g. cudaMemcpy( )).

In the depicted embodiment, memory 412 storing the collection of hash values contained in hash table 520 is filled block by block. So, for example, new hash values may be added to a memory block (e.g. Block 1, FIG. 10) until that memory block fills up, at which time, a subsequent new hash value may be added to the next memory block (e.g. Block 2). Specifically, with each new hash value to be added to the collection of hash values (i.e. hash table 520), the current memory block may be determined (S1106). Next, a determination is made whether the current memory block is full (S1108). If not, the new hash value may be added to the current memory block (S1112), e.g. after the last-added hash value. If the memory block is full, then the next memory block may be marked as the current memory block (S1110). If the current memory block has been previously used (and is therefore full), as determined in S1114, the hash values in the current memory block may be cleared in S1116 by, for example, overwriting all memory locations in the current memory block with 0's. The new hash value may then be copied to the current memory block (e.g. at the beginning) (S1112). If the first cleared block fills, the subsequent second block may be cleared, and so on. In this way, the n-blocks of GPU memory 412 maintain a rolling window in time of hash values 506. Conveniently, a pointer may be kept to the current insert location for hash table 520.

Once the new hash value has been added to a particular memory block of GPU memory 412, and hence added to the collection of hash values stored in hash table 520, DDD application 402 may optionally instruct GPU 328 to sort the hash values stored in that particular memory block (S1118). Algorithms for sorting values stored in a memory may be known to those of ordinary skill. As the bitonic sort algorithm is effective in a parallel execution environment, it may be especially selected for the present purpose. While it is not necessary that hash values within a given memory block (e.g. blocks 1, ..., m) be sorted, maintaining sorted hash values within each memory block may increase the efficiency of the search operation of DDD application 402, as detailed below. In some instances, however, depending on the characteristics of the collection of hash values (e.g. the statistical distribution of the hash values), a mixture of sorted and non-sorted hash values may in reality provide better performance than a fully sorted collection of hash values, or a fully non-sorted collection of hash values.

In the depicted embodiment, hash values are sorted in ascending order based on their high parts (e.g. portion 902 of MICR hash value 506a, and portion 908 of image hash value 506b, FIG. 9B). In the event system 300 includes multiple GPUs 328, DDD software 402 may first select one of the multiple GPUs (S1102) to which a new hash value is to be added. Thereafter, the new hash value is added at that GPU, to the next non-full memory block as described above.

As should now be appreciated, hash table 520 will be stored in memory blocks 1 ... m of the one or more GPUs. Hash table 520 contains a collection of hash values, each representative of one or more features of an already processed financial document (i.e. its MICR data or image data). In the single GPU embodiment, each memory block of the GPU will store a subset of hash table 520. Within each block, hash values 506 (and ancillary data, in the form of timestamps) are stored in sorted order based on the high parts of the hash values. In the multiple GPU embodiment, each hash table 520 of each GPU maintains in its hash table a subset of the collection of hash values representative of already processed financial documents.

Now, for each newly received hash value 506, DDD application 402 also checks table 520 to determine whether or not that hash value has already been added to table 520—signifying possible duplicate document processing.

Figure 12:
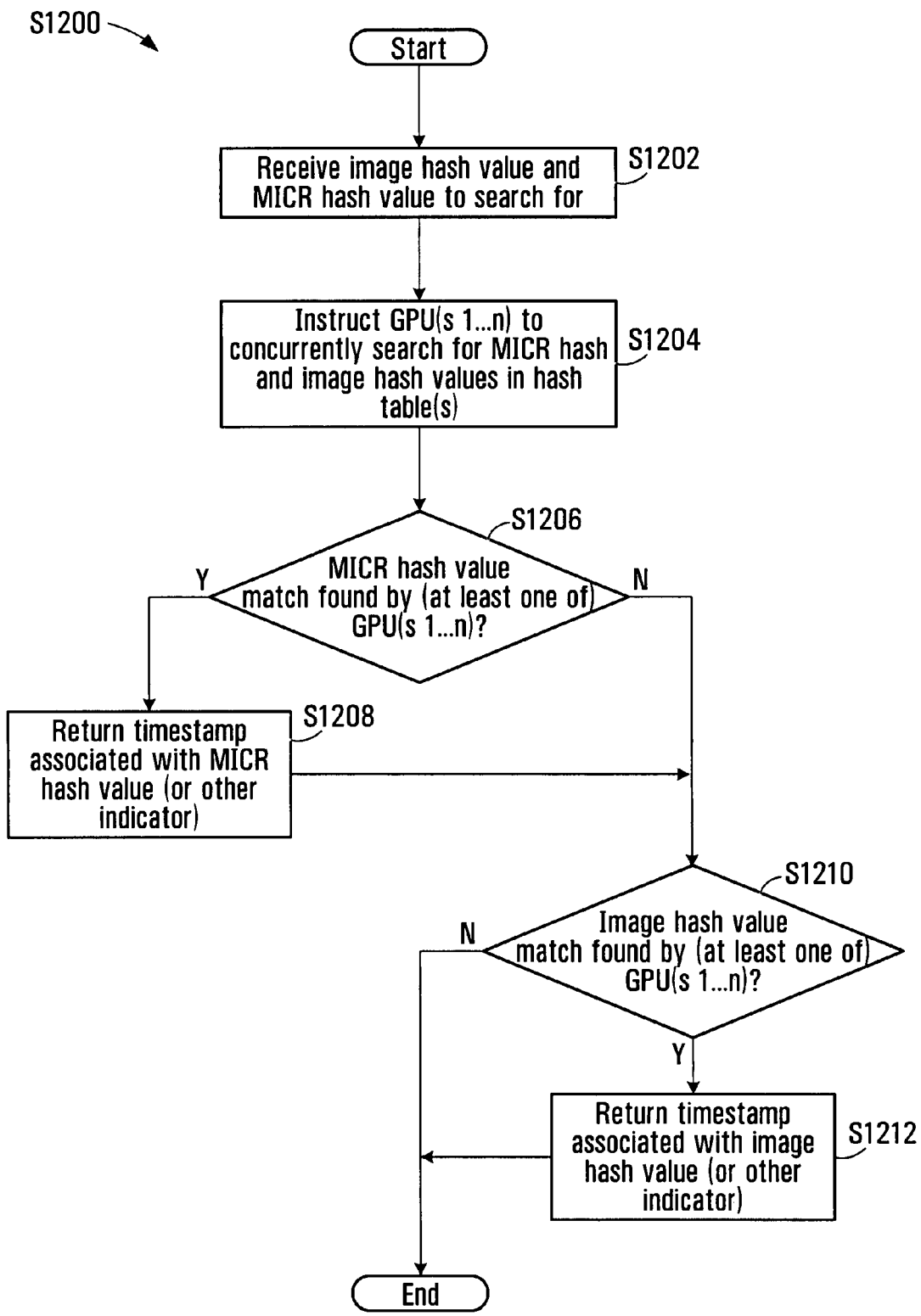
FIG. 12 is a flow diagram depicting operation of a search operation of the DDD application of FIG. 5.

Flow diagram S1200 (FIG. 12) depicts operation of DDD application 402, specifically, of scatter-gather function 510. Flow diagrams 1300A and 1300B depict corresponding operation of kernel 414. As illustrated, scatter-gather function 510 may receive an image hash value (506b) and MICR hash value (506a) to search (S1202). In the single GPU embodiment scatter-gather function 510 may instruct a single GPU 328 to search for the image hash value and MICR hash value in hash table 520 (S1204). In the presence of multiple GPUs, scatter-gather function 510 may instruct the multiple GPUs to concurrently search for the image and MICR hash values (S1204).

In the depicted embodiment both MICR hash values (e.g. MICR hash value 506a) and image hash values (e.g. image hash value 506b) are stored in hash table 520. As such, for any document, both the MICR hash value 506a and the image hash value 506b may be searched.

If MICR hash value (506b) is found by GPU 328 (i.e. matches a value already stored in hash table 520) as determined in S1206 the time stamp 914 associated with the matching MICR hash value (506b) may be returned (S1208). Conveniently, the return of the timestamp associated with the matching hash value provides information regarding when the duplicated document was first captured (or previously processed by system 200). Also conveniently, as noted above, a timestamp (914 and 916) may be a 32 bit value and may be, for example, a date/time value, thus providing more accurate information regarding when the duplicated document was first captured.

Alternatively, the 32 bit value may signify other information, for example, a memory location where an image of the associated document is stored, thus allowing retrieval of the image. Conveniently, if the 32 bit value is a key, for example, in financial document archive 210, ancillary information associated with the suspect image could be retrieved from financial document archive 210 and further decisions made in accordance with the retrieved ancillary information. For instance, If the ancillary information indicates that the suspect documents were processed on the same day, or originated from the same financial institution, this may indicate an innocent error, or no error at all, in contrast to a fraudulent event. Thus, depending on the ancillary information associated with a duplicated document, different categories of potential errors may be identified and appropriate error handlers may be invoked.

Of course, indicators other than the timestamp (e.g. ancillary information) may also be returned.

If image hash value (506b) is found by GPU 328 (S1210) the timestamp (or another indicator) associated with the matching image hash value (506b) may be returned in S1212. Of course, image hash 506b and MICR hash 506a could be concurrently searched.

The result of the operation described by flow diagram 1200 may be returned as search result 516 (FIG. 5). Additionally, upon identifying a duplicated document (i.e. a positive search result 516), a suspect message could be sent to an external handling system along with information regarding the suspect financial document. For example, images of the suspect financial document(s) could be presented to a human operator for review, along with an indication of the nature of the match (e.g. match on image hash value and/or match on MICR hash value).

Figure 13A:
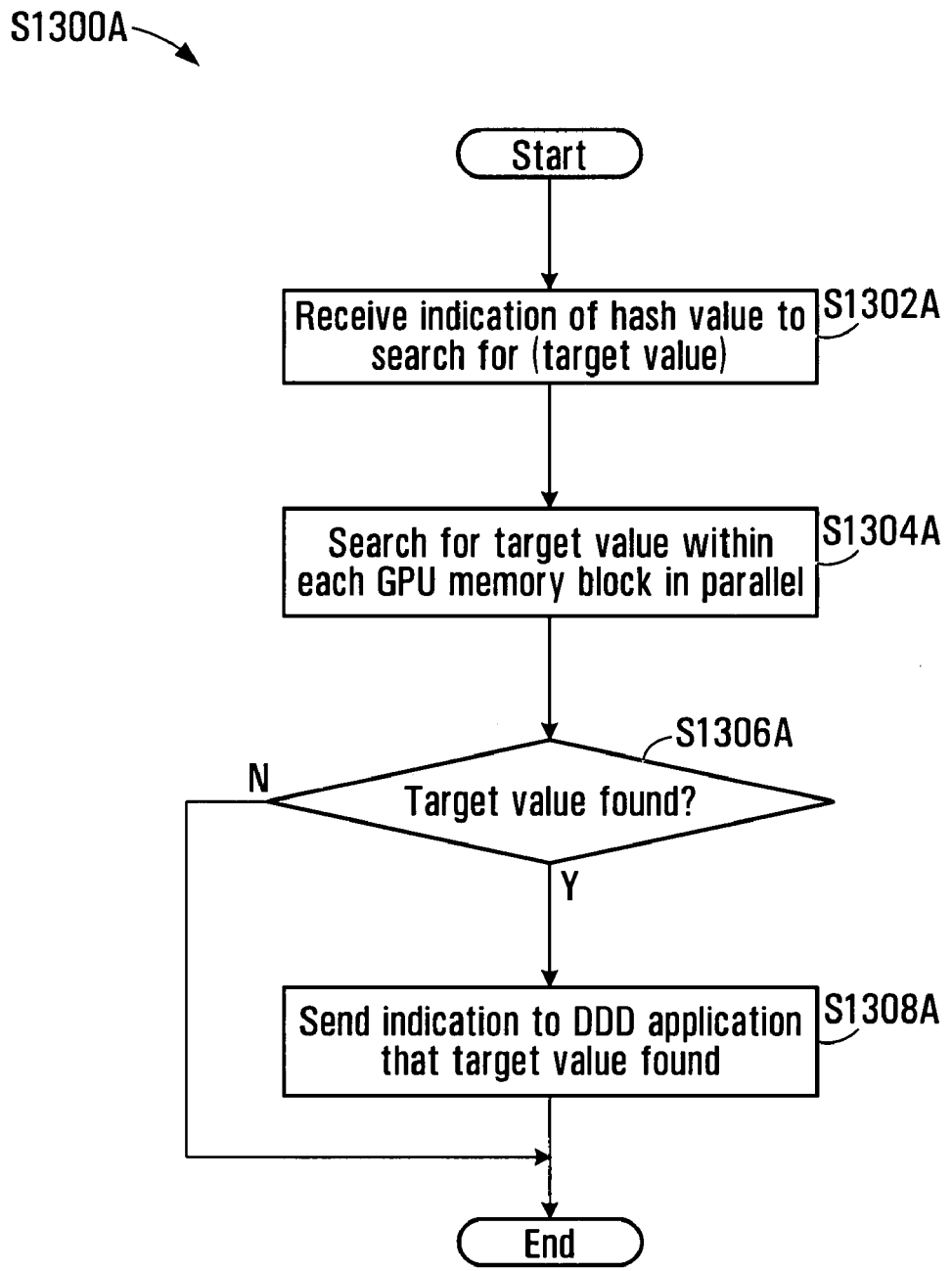
FIGS. 13A and 13B are flow diagrams illustrating embodiments of a search function executed by the GPU of FIG. 5.

Each search of hash table 520 may be performed by GPU 328, and more specifically, by search function 516 of kernel 414. FIG. 13A is a flow diagram S1300A depicting one version of the search function 516 performed by GPU 328. GPU 328 may receive a hash value 506 (e.g. hash values 506a or 506b) to search for ("target value") in S1302A. GPU 328 may execute a plurality of threads that execute search function 516 on all GPU memory blocks in parallel. For instance, referring to FIG. 10, GPU memory 412 may be partitioned into m memory blocks. At step S1304A, m threads may be spawned by GPU 328. Each of the m threads may search within a memory block. More specifically, search thread 1 may search for the target value in block 1; search thread 2 may search for the target value in block 2, and so on. All m threads may execute search function 516 in parallel (i.e. concurrently). Conveniently, the CUDA API allows a calling program to specify how many threads should be launched, and the memory space accessible by each thread. Conveniently, more than one thread may also operate on a given memory block—i.e. more than m threads may be spawned such that more than one thread may operate on each of the m memory blocks.

Returning to flow diagram 1300A, if the target hash value is found in any one of memory blocks 1, ..., m (S1306A), an indication may be sent to DDD application 402 that the target value was found (S1308A) (e.g. the timestamp associated with the matching hash value may be returned). Otherwise, no indication may be sent; alternatively, an indication that the target value was not found may be sent. Conveniently, if the hash values within each of memory blocks 1, ..., m are sorted, then search function 516 of kernel 414 may be a binary search algorithm.

Figure 13B:
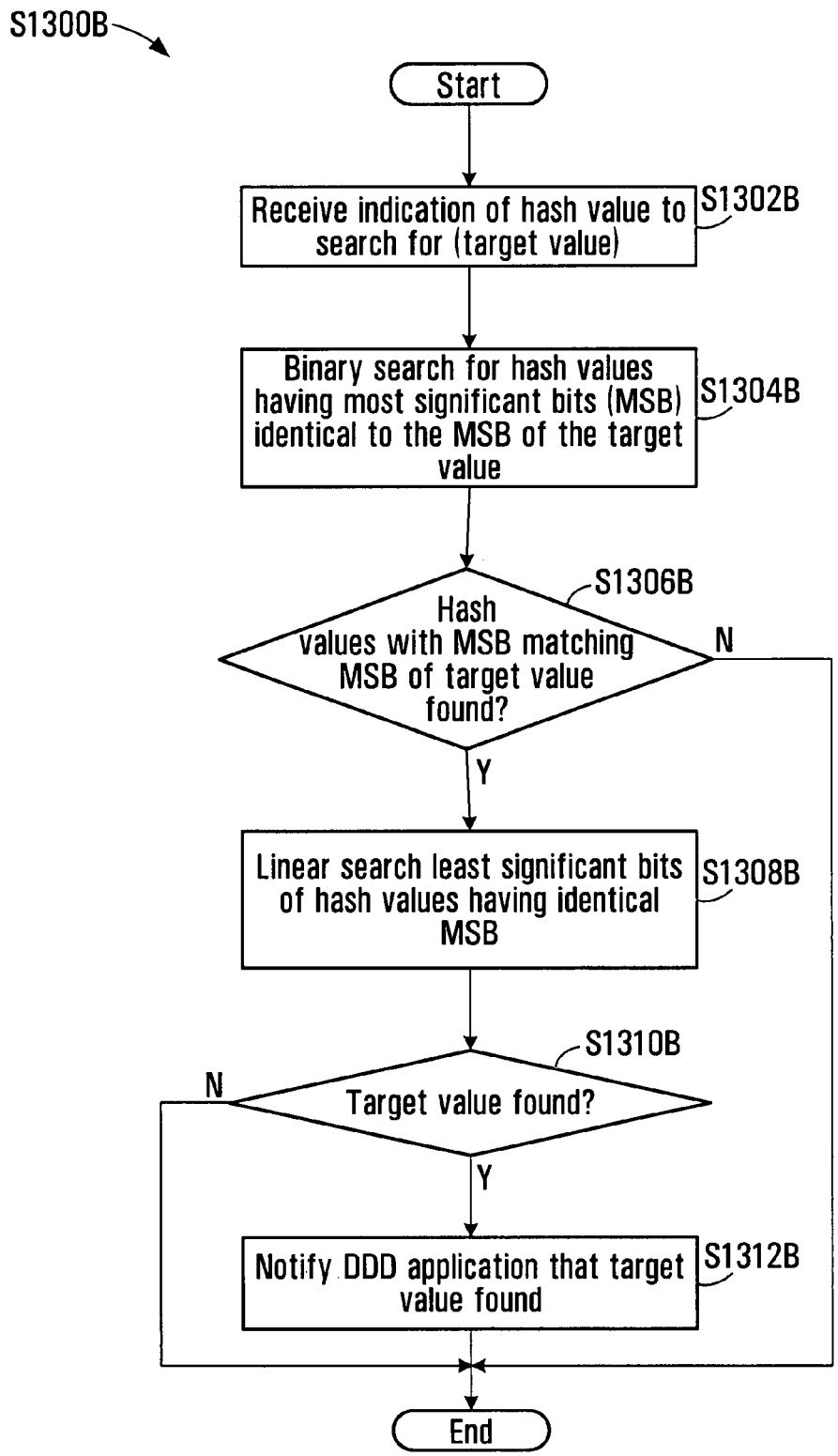

Flow diagram 1300B (FIG. 13B) depicts operation of an alternate search function 516 which takes advantage of the fact that hash values within a given memory block may be sorted. Specifically, to reduce the time required for sorting, the hash values 506 and ancillary data within a memory block may be sorted solely by their most significant bits (e.g. MICR hash value high 902 of MICR hash value 506a (FIG. 9A), and image hash value high 908 (FIG. 9B)) at S1118, FIG. 11. As such, after receiving an indication of a hash value to search for ("target value") (S1302B) an initial search for a matching value in memory 412 may quickly locate hash values 506 with identical most significant bits, for example using a binary search (S1304B). Once located (S1306B), a linear search of the least significant bits of hash values 506 with identical most significant bits may be performed (S1308B). Upon finding a hash value which matches the target value (i.e. with identical most significant bits and identical least significant bits) (S1310B), a notification may be sent to DDD application 402 that the target value was found (S1312B).

It may now be appreciated that whereas previously, if there were 1,000,000 hash values in hash table 520 to be searched, and the search was to be performed by a process running on CPU 308, in the worst case scenario, 1,000,000 hash values may have to be visited. This problem may be diminished somewhat by using a more efficient search algorithm (i.e. better than linear search). However, by offloading the search to GPU 328, and taking advantage of multi-threading on GPU 328, the 1,000,000 hash values may be divided up into blocks (e.g. 1,000 blocks of 1,000 hash values) and the 1,000 blocks may be searched in parallel. It may be appreciated that this provides an increase in efficiency.

Moreover, even greater efficiency may be achieved by using more than one GPU. This is the aforementioned multiple-GPU embodiment of DDD system 300. That is, GPUs 328-2, 328-3, ... 328-n may be added to DDD system 300, as depicted in FIG. 5. (In this embodiment, previously identified GPU 328 may considered to be GPU 328-1). Operation of each of GPUs 328-2, ..., 328-n may be as previously described in relation to GPU 328-1. Notably, each of GPUs

**328-2,..., 328-*n* hosts a hash table 520-2,... 520-*n*, and its own copy of kernel 414. Conveniently, additional GPUs 328-2,..., 328-*n* may be added to computing device 312, or may be part of other computing devices networked to, and possibly geographically remote to, computing device 312**.

In the multiple-GPU embodiment of system 300, and as depicted at step S1102 of flow diagram S100 of FIG. 11, before copying a new hash value to GPU memory 412 from system memory 304, DDD application 402 may first select the GPU hosting the GPU memory to which the new hash value is to be added. The GPU may be selected in a round-robin fashion (e.g. if the last new hash value was added to hash table 520 on GPU 328-1, then the next new hash value may be added to hash table 520-2 on GPU 328-2).

Also, in the multiple-GPU embodiment of system 300, the scatter-gather function 510 of DDD application 402 (FIG. 5) may receive a hash value to search for (target hash value), and may concurrently instruct each of GPUs **328-1,... 328-*n* (e.g. via a multicast message) to each search for the target hash value in its memory 412. The results of the search by each of GPUs 328-1,... 328-*n*, may be compiled by scatter-gather function 510 to produce search result 516. Specifically, if the target hash value matches a hash value stored in any of hash tables 520-1,... 520-*n*, then search result 516** may indicate that a match was found.

Significantly, the use of multiple GPUs 328 provides additional gains in efficiency as compared to using even a single GPU. Taking the example in which 5 GPUs are used, the previously discussed 1,000,000 hash values may be distributed across the 5 GPU memories, so that, for example, each GPU stores 200,000 hash values in memory. Then, within each GPU, the 200,000 hash values may be divided across, for example, 1,000 blocks with 200 hash values in each block. It may therefore be appreciated that any single GPU thread may be responsible for searching only 200 hash values, and all the threads may be running in parallel. This may be contrasted with the scenario of one process running on a CPU (e.g. CPU 308) searching through 1,000,000 hash values.

Further efficiency may be achieved by collecting a batch of hash values (e.g. 512 input hash values) to search for and sending the entire batch at once to the GPU for searching. In particular, preparatory search initialization code may be run on CPU 308 prior to calling kernel 414. Thus, by batching input hash values, the initialization code only has to be run once for the batch. In this instance, kernel 414 may search, for example, for all 512 values and return 512 search results. Of course, the batch size could be smaller or larger depending on the number of search requests received at a point in time.

Moreover, the ability to add additional GPUs to system 300 allows system 300 to scale up gracefully as the space of financial document data (i.e. the number of hash values representative of processed financial documents) to be searched increases.

In any event, if DDD system 300 indicates that the MICR hash value representative of check 100 was found in its set of stored hash values, this signifies that a previously processed check may have had an identical MICR line to MICR line of check 100. Because MICR lines of checks are supposed to be unique, this may be suggestive of a potential fraudulent event (i.e. that check 100 was deposited twice).

A similar reasoning applies to image hash value. For instance, if image hash value generated from check 100 matches a stored image hash value, this may indicate that check 100 (or at least the same image of check 100) had previously been processed.

As discussed above, it is not necessary to generate both an image hash value and a MICR hash value for a given check;

however, generating both may provide an additional level of confidence and further, may provide information about the type of error that may have resulted in a duplicated financial document. For example, depending on how image hash value is generated from an image of check 100, two images of check 100 scanned at different times may result in two different image hash values because of variations in the scanning process. Moreover, an altered image of check 100 may also generate two different hash values. Therefore, storing image hash values alone may not provide an adequate degree of confidence. However, the MICR hash value of check 100 taken (e.g. via OCR) from both images may be expected to be the same.

Thus, if for a suspected duplicated document, the image hash and the MICR hash match the image hash and MICR hash of a previously processed document, this may indicate that the same image file (representing a financial document or instrument) was processed twice. However, if, for example, the MICR hashes match but the image hashes do not, this may indicate that two different instances of an image of the check has somehow entered the processing system. As previously discussed, a positive search result may be presented to a human operator for review—the operator may therefore be provided with information regarding the nature of the match (e.g. MICR hashes match, image hashes do not, etc.), and on this basis, the operator may be able to conclusively identify the source of the error.

In a second embodiment of the present invention, features of a financial document other than image and/or MICR line data may be used to generate a hash value. For example, one or more features of a financial document (such as the name and address of the payor 106, name of payee 104, date, courtesy amount 108) may be combined and represented as an array of bytes and that array of bytes may be input into hash function 504 to generate a hash value 506 that is representative of the financial document.

In a third embodiment of the present invention, instead of adding a new hash value to a GPU in round-robin fashion, as described above, each GPU **328-1,..., 328-*n* may store hash values within a certain range. As such, a search for a given hash value may be directed (e.g. by scatter-gather function 510) to the GPU storing hash values in that range. Thus, in this embodiment, only the memory blocks on that particular GPU may be searched (possibly concurrently by multiple threads) for the given hash value; there is no need to run a search on each of GPUs 328-1,..., 328***n*. Similarly, when a new hash value is to be added to hash table 520, it may be added into the hash table (i.e. one or more of **520-1, 520-*n***) which stores hash values in the appropriate range.

A variation of the third embodiment is to further store values within a given GPU memory block by range. Therefore, within a given GPU, instead of having to search all memory blocks of that GPU, only the memory block storing hash values in the appropriate range need be searched. Alternatively, each GPU may not store values in any particular range, however, each memory block of each GPU may.

Another variation of the third embodiment may be to distribute hash values upon inserts across GPUs in another fashion. For example, the first byte of the hash value to be inserted may be input into a function which function outputs which of GPUs **328-1,..., *n*** the hash value will be added to. Conveniently, the function may be chosen to achieve a desired distribution pattern of inserts across the GPUs. Moreover, conveniently, upon receiving a hash value to search for, the first byte of that hash value may be input into the same function to determine which GPU the matching hash value would be stored in, if a match exists. Thus, a search for a matching hash value need only be directed to a particular GPU, and not all GPUs.

Conveniently, if the memory blocks store hash values within a particular range, and batch searching of input hash values is employed, then a further batch search could be run on a given memory block (i.e. for a given memory block, search for all input hash values in the search batch which fall into that range).

In a fourth embodiment of the present invention, hash values (and ancillary data) within a given GPU memory block may be fully sorted. That is, instead of sorting on the high part of the hash values alone, the low parts of the hash values may be sorted, followed by a sort by timestamps. Thus, all zero entries (i.e. 0 in the high part of the hash value, 0 in the low part of the hash value, and 0 in the timestamp) will be located at the beginning of a memory block. As such, empty memory locations into which a new hash value may be added (e.g. at S1100) may be quickly and easily identified.

In a fifth embodiment of the present invention, images of financial documents may be created (e.g. scanned) at locations remote to DDD system 300 (e.g. at branches of financial institutions) and the originals of the financial documents discarded. These images may then be input into DDD system 300. Thus in this embodiment, capture subsystem 208 may be geographically remote from DDD system 300. Equally, financial document archive 210 may be geographically remote from DDD system 300 and capture subsystem 208.

In a sixth embodiment, instead of being geographically remote, as in the previously described alternate embodiment, capture subsystem 208 and DDD system 300 may be hosted on the same computing device such that MICR reader 204 and scanner 202 may be connected to computing device 318, and capture application 206 may be hosted on computing device 318.

Of course, the above described embodiments are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A computer-implemented method of managing financial document data comprising:
at a computing device, maintaining at least a subset of a collection of hash values in a memory of a computer graphics processing subsystem of said computing device, wherein:
said memory is partitioned into a plurality of blocks wherein each of said plurality of blocks operable to store hash values within the entire range of all possible hash values in said collection, and wherein at least a subset of said plurality of blocks stores hash values within an overlapping range, and wherein stored hash values have been stored in said plurality of blocks by said computing device, so as to distribute said hash values across said plurality of blocks;
said plurality of blocks is searchable by said graphics processing subsystem in parallel, and wherein each of said hash values is representative of a feature or features of a financial document;
said method comprising, executing computer executable instructions at said computing device for generating a hash value for a given financial document, said hash value representative of said feature or said features of said given financial document;
executing graphics processing subsystem executable instructions on said graphics processing subsystem, said instructions directing said graphics processing subsystem to search said subset of said plurality of blocks concurrently for a hash value matching said hash value representative of said given financial document; and
returning an indicator indicating whether a matching hash value was found in said memory of said graphics processing subsystem.

2. The method of claim 1 further comprising adding said hash value for said given financial document to said collection of hash values.

3. The method of claim 2 wherein said adding comprises inserting said hash value into a not yet full one of said blocks.

4. The method of claim 3, wherein said adding comprises maintaining hash values in each memory block in a sorted order.

5. The method of claim 4, further comprising sorting said hash values in said memory block using a bitonic sort algorithm.

6. The method of claim 1, wherein said hash value for said given financial document comprises a hash value based on a scanned image of said given financial document.

7. The method of claim 1, wherein said given financial document is a check.

8. The method of claim 1, wherein said given financial document is an electronic representation of a financial instrument.

9. The method of claim 7, wherein said generating a hash value for said given financial document comprises generating a hash value based on the magnetic ink character recognition data of said check.

10. The method of claim 1, wherein said graphics processing subsystem comprises a programmable general purpose computing graphics processing unit.

11. The method of claim 1, further comprising associating and storing a timestamp with each of said hash values, said timestamp representative of at least one of the time and date of processing of an associated financial document.

12. The method of claim 1, further comprising associating and storing an indicator with each of said hash values, said indicator for providing further information regarding an associated financial document.

13. The method of claim 1, wherein said returning an indicator comprises returning a timestamp associated with said matching hash value.

14. The method of claim 1, wherein said returning an indicator further comprises presenting an image representation of said given financial document and an image representation of the financial document represented by said matching hash value to an operator.

15. The method of claim 1, further comprising:
at said computing device, maintaining a second subset of hash values wherein each of said hash values is representative of a feature of a financial document in a memory of a second graphics processing subsystem of said computing device, said memory of said second graphics processing subsystem partitioned into a plurality of blocks wherein each block may store hash values within the entire range of all possible hash values and wherein said plurality of blocks is searchable by said second graphics processing subsystem in parallel and further wherein together said at least a subset and said second subset of hash values represent a full set of financial documents;
executing instructions readable by said second graphics processing subsystem, said instructions directing said second graphics processing subsystem to search at least a subset of said plurality of blocks of said second graphics processing subsystem concurrently for a hash value matching said hash value representative of a feature of said given financial document; and returning an indicator indicating whether a matching hash value was found in said memory of said second graphics processing subsystem.

16. The method of claim 1 wherein hash values stored within each block of said plurality of blocks is maintained in sorted order and wherein said executing said instructions comprises executing said instructions directing said graphics processing subsystem to search said blocks in parallel using a binary search algorithm.

17. A system for financial documents, comprising:
a duplicate document detection subsystem, comprising:
a first computing device, comprising:
at least one graphics processing subsystem, each of said graphics processing subsystems comprising:
a memory storing a plurality of hash values, said memory partitioned into a plurality of memory blocks wherein each block of said plurality of blocks operable to store hash values within the entire range of all possible hash values, and wherein at least a subset of said plurality of blocks stores hash values within an overlapping range, and wherein stored hash values have been stored in said plurality of blocks by said computing device, so as to distribute said hash values across said plurality of blocks; and
a programmable graphics processing unit operable to search said plurality of memory blocks in parallel and return an indicator if a value matching an input hash value is found in any of said plurality of memory blocks;
a capture subsystem in communication with said duplicate document detection system, said capture subsystem comprising:
a capture device for capturing one or more features of said financial document;
a second computing device comprising a processor operable to:
generate at least one hash value from said one or more features of said financial document; and
pass said at least one hash value to said duplicate document detection subsystem as an input hash value.

18. The system of claim 17, wherein said financial document is a check.

19. The system of claim 17, wherein said financial document is an electronic representation of a financial instrument.

20. The system of claim 18, wherein said capture device comprises a scanner for scanning said check to produce an image of said check.

21. The system of claim 18, wherein said capture device comprises a magnetic ink character recognition (MICR) reader for reading a MICR line of said check to produce MICR line data.

22. The system of claim 18, wherein said at least one hash value comprises a hash value generated based on the MICR line data of said check and a hash value generated based on an image of said check.

23. The system of claim 17, wherein said first computing device and said second computing device are the same computing device.

24. The system of claim 17, wherein said first computing device further comprises a processor operable to present an image representation of the financial document represented by said input hash value and an image representation of the financial document represented by said matching hash value to an operator.

25. The system of claim 17, wherein said first computing device further comprises a processor operable to return an indicator of which of said at least one input hash values matches a hash value in any of said plurality of memory blocks.

26. A computing device for detecting duplicate documents, said computing device comprising:
at least one graphics processing subsystem, each of said graphics processing subsystems comprising:
a memory storing a plurality of hash values, each of said hash values representative of a feature or features of a document, said memory partitioned into a plurality of memory blocks wherein each block of said plurality of blocks operable to store hash values within the entire range of all possible hash values, and wherein at least a subset of said plurality of blocks stores hash values within an overlapping range, and wherein stored hash values have been stored in said plurality of blocks by said computing device, so as to distribute said hash values across said plurality of blocks; and
a programmable graphics processing unit operable to search said plurality of memory blocks in parallel and return an indicator if a value matching an input hash value is found in any of said plurality of memory blocks;
a processor operable to:
instruct said at least one graphics processing subsystem to search at least a subset of said plurality of memory blocks concurrently for said input hash value.

27. The computing device of claim 26 wherein said processor is further operable to present an image representation of the document represented by said input hash value and an image representation of the document represented by said matching hash value to an operator.

* * * * *